US008856269B2

(12) United States Patent
Gopalakrishna

(10) Patent No.: US 8,856,269 B2
(45) Date of Patent: Oct. 7, 2014

(54) SYSTEM AND METHOD FOR IDENTIFYING A MASKED IP ADDRESS

(75) Inventor: Rajendra A. Gopalakrishna, Fremont, CA (US)

(73) Assignee: CA, Inc., Islandia, NY (US)

( * ) Notice: Subject to any disclaimer, the term of this patent is extended or adjusted under 35 U.S.C. 154(b) by 862 days.

(21) Appl. No.: 12/643,198

(22) Filed: Dec. 21, 2009

(65) Prior Publication Data

US 2010/0217825 A1    Aug. 26, 2010

Related U.S. Application Data

(60) Provisional application No. 61/154,242, filed on Feb. 20, 2009.

(51) Int. Cl.
*G06F 15/16* (2006.01)
*H04L 29/08* (2006.01)
*H04L 29/06* (2006.01)

(52) U.S. Cl.
CPC .................... *H04L 67/02* (2013.01); *H04L 69/16* (2013.01)
USPC ........................................... 709/217

(58) Field of Classification Search
CPC ....................................... H04L 69/16
USPC ....................................... 709/217
See application file for complete search history.

(56) References Cited

U.S. PATENT DOCUMENTS

| 7,260,837 | B2 | 8/2007 | Abraham et al. |
| 7,340,518 | B1 | 3/2008 | Jenkins |
| 7,366,756 | B2 | 4/2008 | Lindskog et al. |
| 7,366,919 | B1* | 4/2008 | Sobel et al. ..................... 726/22 |
| 7,406,516 | B2* | 7/2008 | Davis et al. .................. 709/224 |
| 7,457,946 | B2 | 11/2008 | Hind et al. |
| 2008/0196098 | A1* | 8/2008 | Cottrell et al. .................. 726/12 |

* cited by examiner

*Primary Examiner* — Maceeh Anwari
(74) *Attorney, Agent, or Firm* — Vierra Magen Marcus LLP

(57) ABSTRACT

A system identifies a real Internet Protocol (IP) address of a computer device having a browser and software for masking the real IP address. The system includes a server in communication with the device through an Anonymous Proxy Server (APS), an algorithm, and a website with embedded dynamic web content from the server. The algorithm identifies the real IP address, and executes the dynamic web content on the browser to open a direct network connection between the server and device. The network connection identifies the real IP address. A method for identifying the real IP address includes embedding dynamic web content within the website, executing the content within the browser when the device accesses the website via a first network connection, thereby opening a second network connection between the server and device. The real IP address is identified over the second network connection, and a security action may be executed.

17 Claims, 2 Drawing Sheets

SYSTEM AND METHOD FOR IDENTIFYING A MASKED IP ADDRESS

CROSS-REFERENCE TO RELATED APPLICATIONS

This application claims priority to and the benefit of U.S. Provisional Patent Application No. 61/154,242, filed Feb. 20, 2009, which is hereby incorporated by reference in its entirety.

TECHNICAL FIELD

The invention relates to computer system methodologies for concealing or masking a user's internet protocol (IP) address, and in particular to a system and a method for automatically identifying a real IP address from a user's masked or otherwise anonymous IP address.

BACKGROUND OF THE INVENTION

Every computer that connects to the Internet is assigned a numeric Internet Protocol (IP) address, i.e., an exclusive numeric address that enables proper network communications between the various devices connected to the Internet. IP addresses are typically assigned by an Internet Service Provider (ISP), e.g., using the Dynamic Host Configuration Protocol (DHCP) or other suitable means. The ISP can be statically allocated, or it can be dynamically allocated on a session-by-session basis. Once allocated, the ISP uniquely identifies the user's computer from among the host of other connected devices.

Although the evolution of the Internet has been invaluable, illicit or illegal computer-based activities have increased as a result of the Internet's global growth. As a result, the privacy and security of Internet users are each placed at some level of risk. In answer to the rising privacy and security concerns, software and/or network routing-based IP masking or other anonymous web surfing applications have emerged, and their use is now considered quite common. For example, software applications exist that hide or obfuscate a user's real IP address, typically by routing the user through an Anonymous Proxy Server (APS) prior to connecting to the user's intended website. The website sees the connected user's IP address as being something different than the user's real IP address.

As will be understood by those of ordinary skill in the art, a computer can act as an APS, and such APS designation can occur with or without the knowledge of the owner of that particular computer. Improper configuration of proxy software running on the computer can produce this result, as can an infection by malware that is specially designed for such a purpose. If a computer is acting as an APS due to a malware infection, the infected computer is typically referred to as a "zombie". Finding a computer to act as a zombie on the Internet is generally easy given the sheer number of networked computers at any given time.

While APS routing is highly effective for its intended purposes, such identity or privacy protection systems may also be used by perpetrators of illicit activity in order to disguise their identity from targeted websites, as well as from authorities. Additionally, by tracking an unprotected user's IP address and associated online activity, accurate profiles can be built of the user's unique preferences and interests. Such profiles can have relatively innocuous applications, e.g., targeted pop-up advertisements. However, these user profiles can also be used in a manner that ultimately compromises the user's identity.

SUMMARY OF THE INVENTION

Accordingly, computer-based system and method are provided for effectively tracking or identifying the real Internet Protocol (IP) address of a user having a masked or an anonymous IP address. In accordance with the invention, predetermined dynamic web content is automatically embedded via a server within a target website hosted by the server, and then automatically executed within a web browser that is resident on a user's computer whenever the user accesses the target website. A new direct network connection, e.g., a socket connection, is opened between the user's computer and the target website upon execution of the dynamic web content.

Using this new direct network connection, the target website automatically detects the real IP address of the user, i.e., the IP address originally assigned by the user's Internet Service Provider (ISP) and resident on the user's computer. Optionally, the dynamic web content can directly send internal IP address and hostname information to the target website over the direct network connection. With either or both options, the target website can identify the user's real IP address.

In particular, a system is provided for identifying a real IP address of a computer device having a web browser and software for masking the real IP address. The system includes a server adapted for hosting a target website, the server being in remote network communication with the computer device through at least one Anonymous Proxy Server (APS), and an algorithm, executable by the server, for identifying the real IP address. The algorithm is adapted to automatically execute the dynamic web content via the web browser of the computer device to thereby open a direct network connection between the server and the computer device, and further adapted for using the direct network connection to identify the real IP address resident on the computer device.

A method for identifying a real IP address includes embedding a set of dynamic web content into a website hosted by a server, then downloading and executing the set of dynamic web content within a web browser of the computer device when the computer device accesses the website via a first network connection. Executing the set of dynamic web content automatically opens a second network connection between the server and the computer device. The method further includes identifying the real IP address via the set of dynamic web content over the second network connection.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
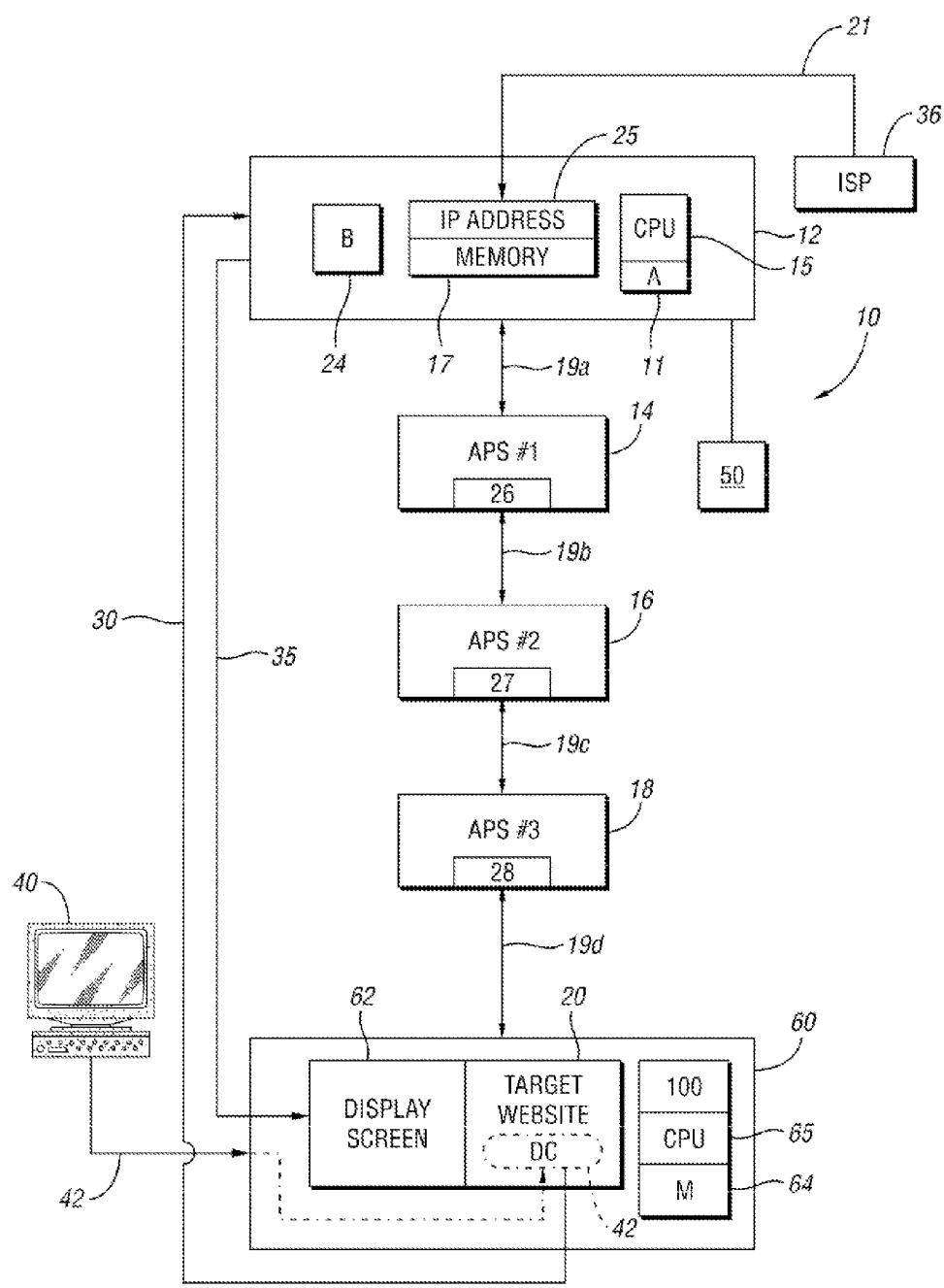
FIG. 1 is a schematic illustration of a system for detecting the real IP address of a user having an anonymized or masked IP address.

Referring to the drawings, wherein like reference numbers refer to like components, and beginning with FIG. 1, a server-based system 10 in accordance with the present invention is adapted for defeating anonymizing or masking capabilities of an anonymizing system 50. Anonymizing system 50 is any system configured for masking, hiding, and/or otherwise rendering anonymous a real IP address of a user, or more precisely the real IP address of a machine or computer device 12 accessible by such a user. The computer device 12 includes IP anonymizing or masking software 11, a web browser (B) 24, a Central Processing Unit (CPU) 15, suitable memory 17, and a real IP address 25 previously assigned over a network connection 21 by the user's Internet Service Provider (ISP) 36.

Using the software 11, the computer device 12 is placed in remote communication with one or more Anonymous Proxy Servers (APS) 14, 16, and 18 via a corresponding network connection 19A, 19B, 19C, respectively, and ultimately with a host machine or server 60 hosting a target website 20, with the term "target" as used herein denoting an intended destination website. That is, a user of the computer device 12 accesses the target website 20 in the ordinary manner, such as by typing or entering a predetermined Uniform Resource Locator (URL) into the browser 24.

A network connection 19D between the computer device 12 and the server 60 is thus made through one or more of the intervening APS 14, 16, and/or 18 through connections 19A, 19B, and/or 19C, respectively, with the interposition of the APS 14, 16, and/or 18 effectively hiding or masking the real IP address 25 from server 60. The physical locations of APS 14, 16, and 18 can differ widely from each other to further optimize the capabilities of the software 11. For example, APS 14, 16, and 18 can be located in the United Kingdom, Japan, and the United States, respectively, or in any other combination of countries or locations capable of hosting an APS.

Still referring to FIG. 1, the computer device 12 can be configured as a desktop or a laptop personal computer, a Personal Data Assistant (PDA), a cell phone, or any other electronic device having the CPU 15, memory 17, and browser 24. However configured, the computer device 12 can use the network connection 19A to access the APS 14, shown in FIG. 1 as APS #1. The APS 14 then hides or masks the real IP address 25 to form a masked IP address 26, which then becomes the IP address detected by the server 60 absent interposition of another APS.

APS 14 does not typically cache its contents, log any requests/responses, or tunnel such requests. As a result, a user of computer device 12 is able to effectively conceal the real IP address 25. While the APS 14 is described here for exemplary purposes, either of the other APS 16 or 18 could also be used in the same manner, with the specific APS 14, 16, or 18 potentially changing with each succeeding Internet connection by the computer device 12, i.e., with the network connections 19B or 19C opening randomly or in turn.

Masking of the real IP address 25 can be provided using a daisy-chain approach, wherein the computer device 12 communicates directly with the APS 14, which masks the real IP address 25 of the computer device 12 as the masked IP address 26. The APS 14 in turn communicates with the APS 16, i.e., APS #2, wherein the masked IP address 26 is further masked as the masked IP address 27. The APS 16 can do the same with the APS 18, i.e., APS #3, with the masked IP address 27 being further masked to form the masked IP address 28. While only three APS are shown in the daisy-chain in FIG. 1, the chain can extend to any number of APS to further separate the true IP address 25 from the server 60. In this example, the server 60 sees the computer device 12 as having the masked IP address 28, and not the true IP address 25.

The system 10 includes a host machine or server 60 hosting the target website 20, as well as memory (M) 64, a display screen 62, a CPU 65, and an algorithm 100 adapted for tracking or identifying a masked IP address of computer device 12, i.e., for identifying the real IP address 25. Memory 64 can include, by way of example, Read Only Memory (ROM), Random Access Memory (RAM), electrically-erasable programmable read only memory (EEPROM), etc., of a size and speed sufficient for executing algorithm 100, which is set forth in detail below with reference to FIG. 2.

Still referring to FIG. 1, the server 60 can also be configured or equipped with other required computer hardware, such as a high-speed clock, requisite Analog-to-Digital (A/D) and Digital-to-Analog (D/A) circuitry, any necessary input/output circuitry and devices (I/O), as well as appropriate signal conditioning and/or buffer circuitry. Any algorithms resident in the server 60 or accessible thereby, including algorithm 100, can be stored in memory 64 and automatically executed by CPU 65 to provide the respective functionality.

A user of the computer device 12 accesses the target website 20 in the ordinary manner, e.g., by entering a predetermined URL into browser 24, with the real IP address 25 being anonymized or masked. Upon occurrence of this event, the server 60 automatically executes algorithm 100. Prior to or coinciding with an execution of algorithm 100, a set of Dynamic Content 42, abbreviated DC in FIG. 1, e.g., dynamic web content such as an applet such as Java or Flash, a streaming multimedia file, software such as Microsoft® Silverlight™, Java FX, etc., which can be generated offline using another computer device, represented as host machine 40, or generated by the server 60, is automatically embedded in the target website 20 of server 60, and automatically downloaded to and executed within the browser 24 of computer device 12 as part of an opening of a web page within the browser.

As will be understood by those of ordinary skill in the art, for network security purposes the software of the dynamic web content 42 is configured to connect back only to the server 60. As a result, the dynamic web content 42 will open a new and direct network connection 30, such as a socket connection, the Internet Protocol Suite or TCP/IP connection, or any other suitable connection or communications link, between the target website 20 and the computer device 12. This allows the dynamic web content 42 to "call back home" to the server 60 without notice or warning to the user of computer device.

This callback feature provided by network connection 30 is sufficient for identifying the real IP address 25 of computer device 12. That is, the network connection 30 can be exploited by the target website 20 to ultimately identify the real IP address 25 as needed, which can include the retrieval of the real IP address, the transmission of this information as a signal 35, and/or the optional display of the real IP address on the display screen 62 of server 60, and/or the recording of the real IP address in memory 64, as will now be explained with reference to FIG. 2.

Figure 2:
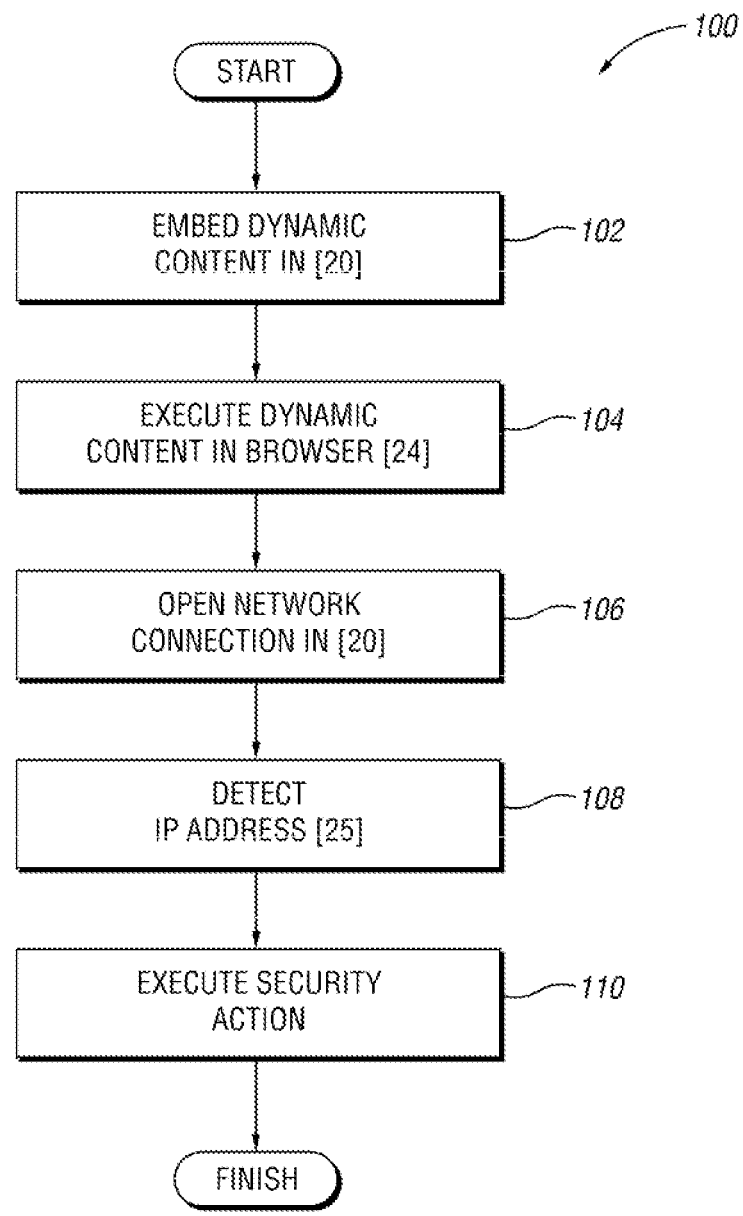
FIG. 2 is a graphical flow chart describing a process or a method for detecting the real IP address of a user using the system shown in FIG. 2.

Referring to FIG. 2, and with reference to the various system elements shown in FIG. 1 and described above, the algorithm 100 of the present invention begins at step 102, wherein the dynamic web content 42 is automatically embedded by the server 60 within the target website, or within the various web pages thereof. As noted above, the dynamic web content 42 can be generated offline via the host machine 40, or it can be generated by the server 60, within the intended scope of the invention. The APS 14, 16, 18 are intended herein to be of the type of APS which re-write the static webpage contents provided from the target website 20, e.g., HTML, JavaScript, image URL, etc., so that the static webpage contents point to the connected APS 14, 16, or 18.

Likewise, a query from a user of computer device 12 can be modified by the connected APS 14, 16, or 18, typically accompanied with a disabling of caching. However, as the APS 14, 16, and 18 cannot parse or change the dynamic web content 42, the server 60 and algorithm 100 can defeat the anonymizing or masking capabilities of software 11 as set forth below in steps 104-110. Once the dynamic web content 42 is embedded, the algorithm 100 proceeds to step 104.

At step 104, computer device 12 attempts to access the target website 20 through one or more intervening APS, such as the exemplary APS 14, 16, and/or 18. In response to the attempted access, the server 60 automatically downloads and executes the dynamic web content 42 within the browser 24 of computer device 12. Upon execution of the dynamic web content 42, algorithm 100 proceeds to step 106.

At step 106, a new and direct network connection 30 opens between the server 60 and the computer device 12, such as a socket connection, TCP/IP, or other suitable connection. Once connection 30 is established, algorithm 100 proceeds to step 108.

At step 108, the target website 20 of server 60 reads or detects the real IP address 25 of computer device 12, i.e., the IP address originally assigned by the ISP 36. Once detected, the real IP address 25 is transmitted or communicated to server 60 as the signal 35. The algorithm 100 then proceeds to step 110.

At step 110, the algorithm 100 executes one or more appropriate security actions, which can vary within the scope of the invention depending on the severity of the actions of the user. For example, the real IP address 25 can be displayed via the display screen 62, e.g., a monitor of network security personnel working for or with the target website 20, and/or recorded in memory 64. The real IP address can be tracked over time to determine the collective actions of the user of the computer device 12. For example, the real IP address 25 could be shared between different target websites 20 and/or with law enforcement authorities in a collaborative effort to prevent further malicious Internet activity.

Likewise, server 60 could optionally use the dynamic web content 42 to detect not only the real IP address 25, but also the internal IP address and/or hostname of the computer device 12 using the same direct network connection 30. Additionally, the real IP address 25 can be processed or decoded as needed to determine the true location of a user of the computer device 12, a result that could have particular efficacy in instances of fraud, hacking, identity theft, and/or other malicious computer-based crimes.

While the best modes for carrying out the invention have been described in detail, those familiar with the art to which this invention relates will recognize various alternative designs and embodiments for practicing the invention within the scope of the appended claims.

The invention claimed is:

1. A system for identifying a real Internet Protocol (IP) address of a computer device having a web browser and a real IP address which is masked using at least one Anonymous Proxy Server (APS) to create a masked IP address, the system comprising:
a server hosting a target website with an embedded set of dynamic web content, wherein the server is in remote network communication with the computer device through the at least one APS; and
an algorithm, executable by the server from memory of the server, for identifying the real IP address, wherein the server is configured to execute the algorithm when the computer device accesses the target website with the masked IP address over a first network connection through the at least one APS, including:
automatically downloading the set of dynamic web content to the computer device via the web browser over the first network connection;
executing the set of dynamic web content within the web browser;
opening a second network connection directly between the server and the computer device that bypasses the at least one APS; and
using the direct network connection to identify the real IP address resident on the computer device.

2. The system of claim 1, wherein the server is further configured for executing at least one security action upon identifying the real IP address.

3. The system of claim 2, wherein the at least one security action includes at least one of: remotely retrieving the real IP address from the computer device, recording the real IP address, displaying the real IP address on a display screen, and tracking the real IP address.

4. The system of claim 1, wherein the dynamic web content communicates with the server without the server providing notice to a user of the computer device.

5. The system of claim 1, further comprising a host machine in communication with the server, wherein the host machine is configured for generating the dynamic web content offline from the server.

6. A system for identifying a real Internet Protocol (IP) address of a computer device having a web browser and software for masking the real IP address via a daisy-chain of Anonymous Proxy Servers (APSs), the system comprising:
a server hosting a target website, wherein the server is in remote network communication with the computer device through the daisy-chain of APSs and wherein the target website includes embedded dynamic web content; and
an algorithm, executable by the server from memory of the server, for identifying the real IP address of the computer device, wherein the computer device uses a masked IP address which is masked by each APS in the daisy-chain of APSs to access the server over a first network connection;
wherein the server is configured to automatically download and execute the dynamic web content to the computer device via the web browser over the first network connection as one of an applet and a streaming media file when the computer device accesses the server over the first network connection to thereby open one of a direct socket connection and a direct TCP/IP connection between the server and the computer device bypassing the daisy-chain of APSs, and is further configured for using the direct socket connection or the direct TCP/IP connection as a second network connection to identify the real IP address.

7. The system of claim 6, wherein the server is further configured for executing at least one security action upon identifying the real IP address.

8. The system of claim 6, further comprising a host machine in communication with the server, wherein the host machine is configured for generating the dynamic web content offline from the server.

9. The system of claim 8, wherein the at least one security action includes at least one of: remotely retrieving the real IP address from the computer device, recording the real IP address, displaying the real IP address on a display screen, and tracking the real IP address.

10. A method for identifying a real Internet Protocol (IP) address of a computer device having a web browser and software for masking the real IP address via at least one Anonymous Proxy Server (APS) to create a masked IP address, the method comprising:

embedding a set of dynamic web content into a target website hosted by a server;

downloading and executing the set of dynamic web content within the web browser of the computer device, using the server, when the computer device accesses the target website via a first network connection with the masked IP address, wherein executing the set of dynamic web content automatically opens a second network connection directly between the server and the computer device that bypasses the at least one APS; and identifying the real IP address over the second network connection using the server after downloading and executing the set of dynamic web content.

11. The method of claim 10, further comprising: executing at least one security action via the server in response to detecting the real IP address.

12. The method of claim 11, wherein executing at least one security action includes at least one of: remotely retrieving the real IP address from the computer device, recording the real IP address, displaying the real IP address on a display screen, and tracking the real IP address.

13. The method of claim 10, wherein the second network connection is one of a socket connection and a TCP/IP connection.

14. The method of claim 10, further comprising: generating the dynamic web content offline from the server using a host machine.

15. The method of claim 10, further comprising: using the dynamic web content to detect at least one of an internal IP address and a hostname of the computer device.

16. The method of claim 10, further comprising: processing the real IP address to determine a true location of a user of the computer device.

17. The method of claim 10, wherein the at least one APS includes a daisy-chain of APSs.

\* \* \* \* \*